April 28, 1959
D. L. SCHWARTZ
2,883,789
SELF-AERATING BAIT BUCKET
Filed Feb. 21, 1956
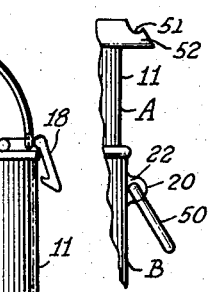
FIG.1.
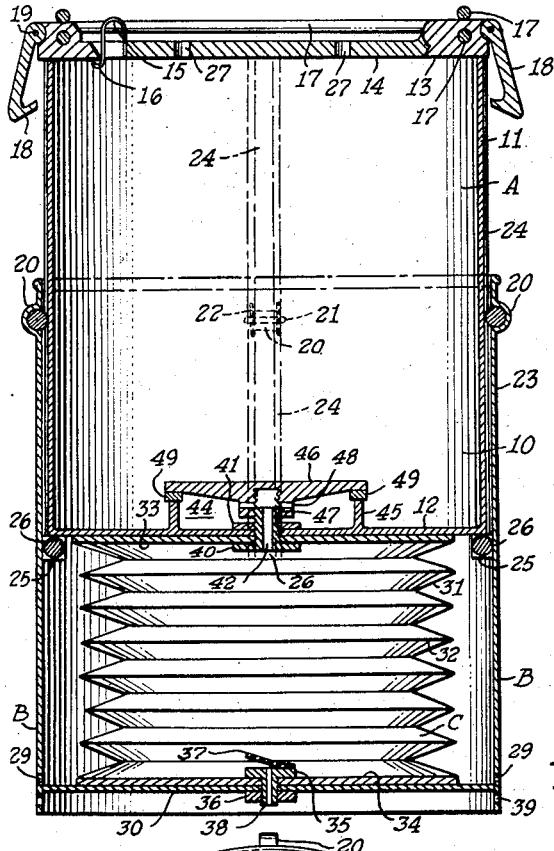
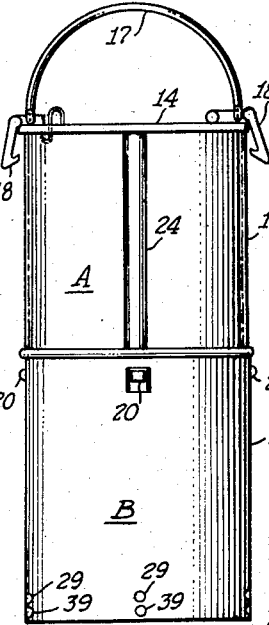
FIG.5.
FIG.6.
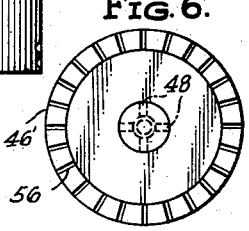
FIG.4.
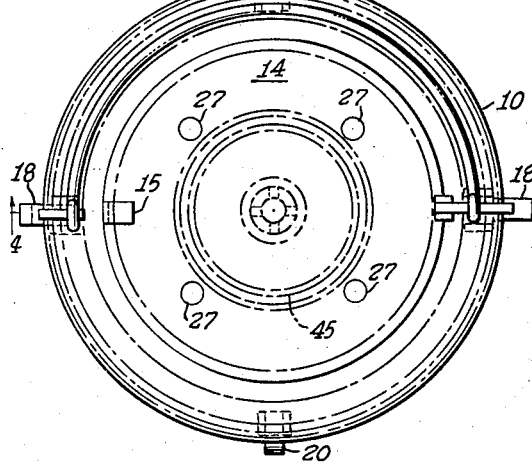
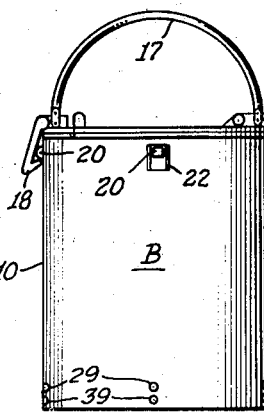
FIG.3.
FIG.2.
INVENTOR
DAVID L. SCHWARTZ
BY *Salvatore G. Militana*
ATTORNEY United States Patent Office 2,883,789
Patented Apr. 28, 1959

2,883,789

SELF-AERATING BAIT BUCKET

David L. Schwartz, North Miami, Fla.

Application February 21, 1956, Serial No. 566,828

5 Claims. (Cl. 43—57)

This invention relates to bait carrying buckets and is more particularly directed to a self-aerating bait bucket.

This invention is an improvement of applicant's patent, No. 2,721,027 entitled Aerated Bait Pail and copending application Serial No. 288,931, now Patent No. 2,754,617 entitled Aerated Bail Pail and filed on May 20, 1952.

A principal object of the present invention is to provide a bait bucket for holding live bait such as shrimp, minnows and the like wherein water contained in the bait bucket is aerated automatically and over an extended period of time.

A further object of the present invention is to provide a bait bucket described as above wherein the aerating apparatus is recharged for further aerating the water by the simple expediency of lifting the bait container so that the lower portion thereof is suspended for no longer than a brief moment.

A further object of the present invention is to provide a self-aerating bait bucket which is provided with an adjustable valve means for controlling the rate and size of bubbles flowing upwardly in water contained in the bait bucket.

A still further object of the present invention is to provide a self-aerating bait bucket with an exceedingly large area from which air escapes into the water containing the live bait whereby a greater amount of live bait may be housed in said bait bucket without causing the suffocation of said bait due to lack of air.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

In the drawing:

Figure 1 is a front elevational view of a bait bucket embodying my invention and shown in its charged position.

Figure 2 is a top plan view thereof.

Figure 3 is an elevational view with the bait bucket in its nonoperating position.

Figure 4 is a cross sectional view taken along the line 4—4 of Figure 2.

Figure 5 is an enlarged fragmentary view showing an alternate construction for locking the bait bucket in its non-operating position.

Figure 6 is a bottom plan view of an alternate construction of a disk valve.

Referring now to the drawings wherein like numerals are used to designate similar parts throughout the several views, the numeral 10 refers to a combination bait container and an automatic aerator therefor consisting in general of an upper bucket A in which the bait is contained and a lower bucket B which houses an aerating device C.

The upper bucket A which is telescopically mounted within the lower bucket B, as is explained in greater detail hereinafter is provided with a side wall 11, bottom wall 12 and an open top wall 13 in which a cover 14 is pivotally mounted by a pivot clip 15 as at 16. A wire bail handle 17 which is pivotally mounted on the top wall 13 is utilized for carrying the device 10 as well as for charging and activating the aerator mechanism C as is explained in detail hereinafter. Means are provided for inactivating or rendering the device 10 inoperative comprising a plurality of resilient clips 18 pivotally mounted as at 19 to the top wall 13 and extending downwardly along the side wall of the containers A and B when the containers are in their fully telescoped position. The lower ends of the resilient clips 18 engage and secure about the lower surfaces of rollers 20 rotatably mounted on fins whose ends are secured to lugs 22 punched outwardly of side wall 23 of the lower container B. The rollers 20 are so mounted that the inner surfaces thereof engage vertical grooves or guide ways 24 formed on the outer wall surface of the side wall 11. At the lower surface of the bottom wall 12 adjacent the wall 23 is a plurality of depending lugs 25 on which are rotatably mounted rollers 26 whose outer surfaces engage the inner surface of the side wall 23. The rollers 20 and 26 permit the upper container A to slide vertically inside the lower container B easily and with as little friction as possible. If desired further rollers may be added or they may be removed therefrom without detracting from the applicant's invention. Also, any well known fastening means may be utilized for removably securing the containers A and B together to inactivate the device 10. Openings 27 are contained in the cover 14 to permit the movement of air outwardly of the container A.

The container B is provided with a bottom wall 30 mounted in spaced relation to the bottom edge of the side wall 23. Housed in the container B and extending between the bottom walls 12 and 30 is the aerator mechanism C consisting of a wire reinforced bellows 31. The bellows 31 is preferably made of plastic molded to shape, and provided with a rigid top wall 33 and bottom wall 34 and wire loops 32 to prevent the bellows 31 from becoming collapsed when fully deflated. However, any suitable material may be used in the construction of the bellows and the wire loops 32 may be omitted if desired. Openings 29 are provided at the base of the side wall 23 but above the bottom wall 30 to permit the escape of any water that may have leaked into the lower container B.

The bottom wall 34 of the bellows 31 is secured to the bottom wall 30 of the container B by a T-shaped threaded valve body 35 which extends through superimposed openings in the bottom walls 34 and 30 and has a lock nut 36 threaded on the valve body 35 tightly against the bottom wall 30. The valve body 35 is provided with a flap valve 37 mounted on the top portion of the valve body 35 within the bellows 31 and with a fluid passageway 38 which permits the flow of air from below the wall 30 into the bellows 31 when the valve 37 is in its open position while openings 39 along the lower edge of the side wall 23 permit the flow of air from the atmosphere to below the bottom wall 30. The aforementioned construction permits the device to be operative when placed on a support such as a floor, table and the like.

The top wall 33 of the bellows 31 is secured to the bottom wall 12 of the container A by a T-shaped valve body 40 similar in construction to the valve body 35 with its head portion abutting against the lower surface of the top wall 33 and a lock nut 41 threaded thereon tightly against the upper surface of the bottom wall 12. A fluid passageway 42 in the valve body 40 connects the bellows 31 and the upper container A to permit a flow of air from the bellows 31 to the container A when the flap valve 43 mounted on top of the valve body 40 is in its open position.

The valve 43 is maintained in a compartment 44 isolated from the upper container A by an upstanding concentric wall portion 45 mounted on the bottom wall 12 with a disk 46 having a threaded hub portion 47 threaded on the upper end of the valve body 40. The hub portion 47 is provided with a plurality of radially disposed bores 48 which communicate with the fluid passageway 42 above the flap valve 43. The flow of air from the compartment 44 into the container A is controlled by an annular felt washer 49 positioned between the disk 46 and the top of the wall 45. Any porous material such as spun glass and the like may be used in place of the felt washer 49 provided, however, that the material used is porous and its degree of porosity can be altered by varying the compressive force imparted by the disk 46 on the material placed on the wall 45. Therefore, as the disk 46 is tightened against the washer 49, the rate of flow of air through the washer 49 is decreased. Also, in the event it is not desired to utilize the porous washer 49, the lower outer edge of the disk 46′ may be provided with radially disposed slots or splines 56 and a rubber, plastic or other non-porous gasket may be inserted in lieu of gasket 49. The air will then escape from the chamber 44 via the slots or splines 56 and the rate of discharge of air will be determined by the amount of pressure being exerted by the disk 46 on the rubber gasket. If the rubber gasket is compressed tightly between the upstanding wall 45 and the rim edge of the valve disk 46′, the rubber gasket will be compressed into the slots 56 to completely cut off the flow of air therethrough. Now by unthreading the valve disk 46′ the compressive force exerted on the rubber gasket will be relieved and the resilient gasket will tend to resume its normal shape and leave its position within the slots 56 to allow air to be discharged therethrough into the container A.

In the normal operation of the bait bucket 10, the upper container A is partially filled with water and live bait such as shrimp, minnows, etc. are placed in the water. Now the wire handle 17 is grasped and an upward pull is exerted thereon while a downward restraining force is maintained on the container B. The container A will slide upwardly of the container B causing the bellows 31 to expand and valve 43 to remain closed while valve 37 is opened to permit air to enter the bellows 31 through openings 39, fluid duct 38 and past the flap valve 37. When rollers 26 come into contact with rollers 20, the upper container A will have reached its topmost position. The bail handle 17 is now released and the weight of the container A and that of the water and bait contained therein will bear downwardly on the bellows 31 placing the air contained therein under positive pressure thereby forcing valve 37 to close and valve 43 to open. Air will escape past the valve 43, the openings 48 into compartment 44 and seep through the porous member 49. As the air escapes through the porous member 49, clusters of bubbles will form in a circle about the periphery of the circular disk 46 and rise to the surface of the water that is contained in container A, thereby aerating the water and replenishing the oxygen therein that had been consumed by the live bait. Air will continue to flow from the bellows 31 into the water in the container A until the container A has slid downwardly in the container B to its lower most position and the bellows 31 has expelled all the air that it had contained therein. To reactivate or recharge the device 10, all a person need do is lift the wire handle 17 and pull thereon to slide the container A upwardly in the container B. As explained above the bellows 31 then becomes reinflated and is ready to expell the air into the water in container A as soon as the wire handle 17 is released and the weight of the container A and the water therein is imposed on the bellows 31.

After the bellows 31 has been completely deflated and the container A is in its lowermost position, the device 10 may be deactivated by swinging the resilient clips 18 into engagement with the rollers 20 thereby securing the containers A and B together. The bait bucket 10 may then be carried by the bail 17 without effecting the activation of the aerating device C.

Another desirable manner of securing the containers A and B together is illustrated by Figure 5. In that modification, the rollers 20 are pivotally mounted on the lugs 22 by a leg portion of a rectangular shaped buckle 50 which is adapted to swing upwardly and engage a cam surface 51 of a lug 52. The lugs 52 are secured to the top wall 13 of the bucket A and extend radially to overhang the side wall 11 of the container A.

Having thus described my invention, what I claim as new and desire to secure by Letters Patent of the United States is:

1. A self-aerating bait pail comprising a rigid base member, an upstanding side wall secured adjacent its lower edge to said base member to form an open top chamber, a bellows having relatively rigid base and cover members mounted in said chamber, fastening means securing said rigid base member and said bellows base member, said fastening means having an air passageway communicating with said bellows, a valve mounted on said fastening means adapted to control the flow of air through said passageway and into said bellows, a bait pail telescopically mounted in said upstanding side wall, said pail having a bottom wall in contact relation with said bellows cover member, a second fastening means securing said pail bottom wall and said bellows cover member, said second fastening means having an air passageway connecting said bellows and said bait pail and a second valve mounted on said second fastening means for controlling the flow of air from said bellows to said bait pail.

2. A self-aerating bait pail comprising a rigid base member, an upstanding side wall secured adjacent its lower edge to said base member to form an open top chamber, a bellows having relatively rigid base and cover members mounted in said chamber, fastening means securing said rigid base member and said bellows base member, said fastening means having an air passageway communicating with said bellows, a valve mounted on said fastening means adapted to control the flow of air through said passageway and into said bellows, a bait pail telescopically mounted in said upstanding side wall, said pail having a bottom wall in contact relation with said bellows cover member, a second fastening means securing said pail bottom wall and said bellows cover member, said second fastening means having an air passageway connecting said bellows and said bait pail, a second valve mounted on said second fastening means for controlling the flow of air from said bellows to said bait pail and further means mounted on said second valve for receiving air flowing past said second valve and permitting the escape of the air into said bait pail over an increased area.

3. A self-aerating bait pail comprising a rigid base member, an upstanding side wall secured adjacent its lower edge to said base member to form an open top chamber, a bellows having relatively rigid base and cover members mounted in said chamber, fastening means securing said rigid base member and said bellows base member, said fastening means having an air passageway communicating with said bellows, a valve mounted on said fastening means adapted to control the flow of air through said passageway and into said bellows, a bait pail telescopically mounted in said upstanding side wall, said pail having a bottom wall in contact relation with said bellows cover member, a second fastening means securing said pail bottom wall and said bellows cover member, said second fastening means having an air passageway connecting said bellows and said bait pail, a second valve mounted on said second fastening means for controlling the flow of air from said bellows to said bait pail, a second upstanding wall mounted on said pail bottom wall, a plate member, means adjustably securing said plate to said second fastening means in spaced relation with said second upstanding wall to form a second chamber, and air flow control means mounted between said upstanding member and said plate member adapted to control the flow of air from said second chamber into said bait pail over an increased area.

4. The structure as recited by claim 3 wherein said air flow control means comprises a porous washer.

5. The structure as recited by claim 3 wherein said air flow control means comprises a deformable washer and radially disposed slots formed on said plate member in contact relation with said washer.

References Cited in the file of this patent

UNITED STATES PATENTS

| | | |
|---|---|---|
| 53,609 | Hainsworth | Apr. 3, 1866 |
| 750,143 | Wilson et al. | Jan. 19, 1904 |
| 2,093,132 | Logan | Sept. 14, 1937 |
| 2,570,684 | Jackson | Oct. 9, 1951 |
| 2,767,510 | Hopkins | Oct. 23, 1956 |
| 2,785,502 | Sandness | Mar. 19, 1957 |